Aug. 29, 1967
H. H. CROSS
3,338,376
TUBE MACHINE
Filed May 5, 1965
2 Sheets-Sheet 1
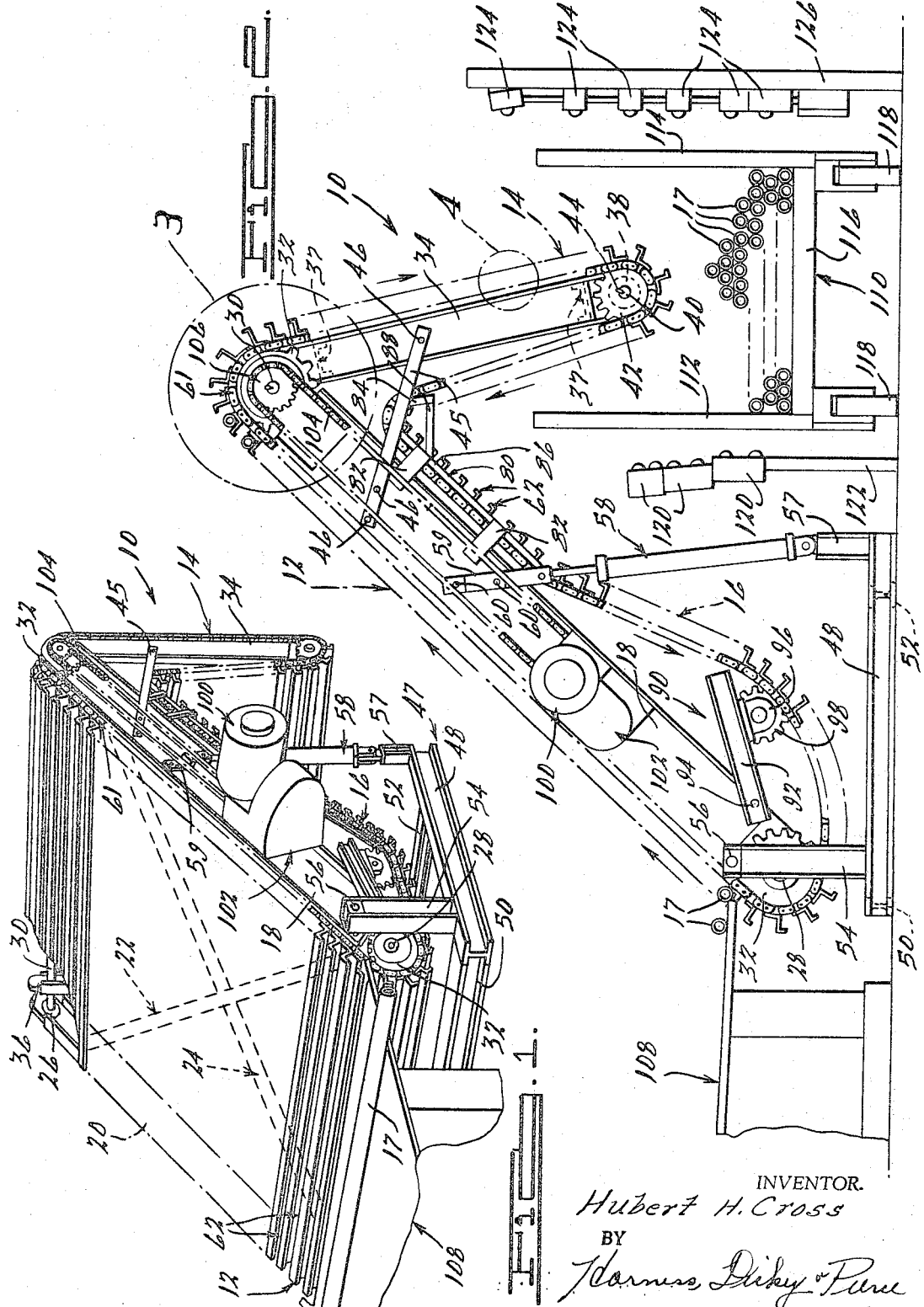
INVENTOR.
Hubert H. Cross
BY
Harness Dickey & Pierce
ATTORNEYS.

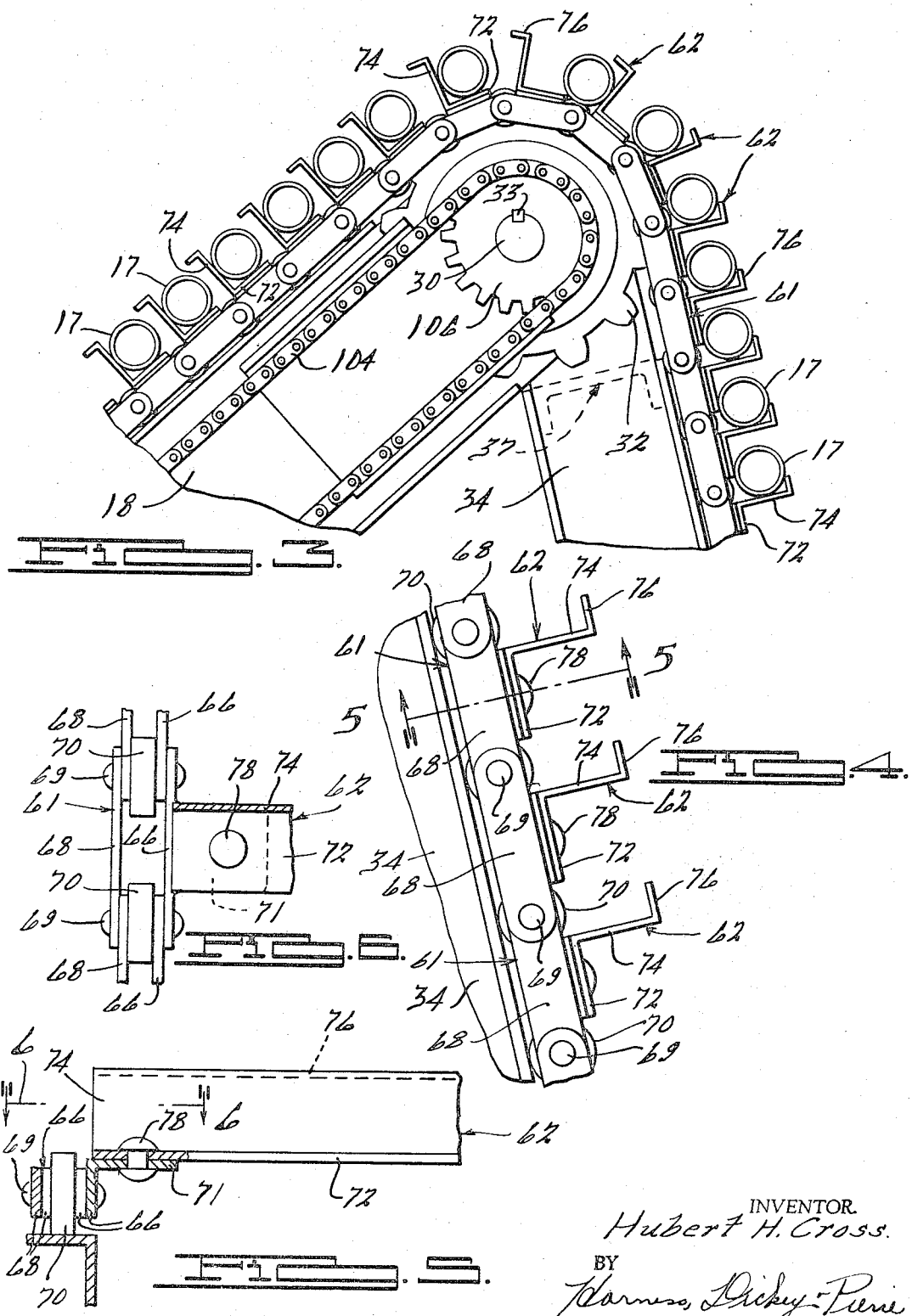

United States Patent Office 3,338,376
Patented Aug. 29, 1967

3,338,376
TUBE MACHINE
Hubert H. Cross, Racine, Wis., assignor to Walker Manufacturing Company, Racine, Wis., a corporation of Delaware
Filed May 5, 1965, Ser. No. 453,357
1 Claim. (Cl. 198—117)

This invention relates generally to apparatus for transporting elongated cylindrical workstock and, more particularly, to a new and improved apparatus for conveying elongated workpieces such as thin-walled tubular members.

It is a general object of the present invention to provide a new and improved apparatus for conveying thin-walled tubular members between two adjacent work stations such as between a tube mill and a tote truck, pallet rack or the like.

It is a more particular object of the present invention to provide a new and improved conveying apparatus of the above character which is adapted to convey successive tubular workpieces upwardly over the vertically extending side wall of a tote truck or the like, and thereafter gently lower the workpieces into the loading bin of the truck or the like.

It is another object of the present invention to provide a new and improved tube conveying apparatus of the above character which includes means for selectively adjusting the vertical distance between the lower portion of the apparatus and the loading bin of the truck in response to the quantity of workpieces deposited or loaded into the truck.

It is still another object of the present invention to provide a new and improved tube conveying apparatus of the above character which may be easily adjusted to accommodate various operating conditions.

It is a further object of the present invention to provide a new and improved tube conveying apparatus of the above character which is of a simple design, easy to assemble and economical to commercially produce.

The foregoing and other related objects and advantages of the present invention are achieved through the provision of a novel tube conveying apparatus which comprises a pair of adjacent conveying platforms that are angularly disposed relative to one another and about which a workstock conveying belt is rotatably mounted. One of the aforesaid platforms is inclined upwardly at a substantial angle from horizontal and is thereby adapted to convey successive tubular workpieces to an elevated position, the other of the platforms depending downwardly from the upper end of the first platform in a manner such that the tubular workpieces may be lowered into an adjacent tote box, truck or the like which is disposed below the second conveying platform of the apparatus. The conveying belt is provided with a multiplicity of outwardly projecting, spaced parallel tube-engaging rails which are adapted to retain successive tubular workpieces upon the platform while simultaneously conveying these workpieces over the apparatus. The rails are arranged on the two platforms such that the workpieces are positively retained upon the conveying apparatus until the distance between the tubes and the associated tote box or truck is at a minimum, at which time the tubes will drop gently into the aforesaid box or truck. The tube conveying apparatus of the present invention includes means for selectively varying the vertical distance betwen the aforesaid truck and the conveying apparatus in response to the quantity of tubular workpieces deposited into the box or truck, whereby the distance which the tubes must fall from the lower end of the conveying apparatus is minimized during the entire time the tote box or truck is being loaded.

A more complete understanding of the present invention and other objects and features thereof will be obtained from the following description taken in conjunction with the accompanying drawings wherein:

FIGURE 1 is an elevated perspective view of the tube conveying apparatus embodying the present invention;

FIGURE 2 is a side elevational view of the tube conveying apparatus illustrated in FIGURE 1;

FIGURE 3 is an enlarged fragmentary side elevational view of a structure illustrated within the circle 3 of FIGURE 2;

FIGURE 4 is an enlarged fragmentary side elevational view of the structure illustrated within the circle 4 of FIGURE 2;

FIGURE 5 is a fragmentary cross-sectional view taken along the line 5—5 of FIGURE 4; and FIGURE 6 is a top elevational view of the structure illustrated in FIGURE 5.

Referring now to FIGURES 1 and 2 of the drawings, a tube conveying apparatus 10, constructed in accordance with the principles of the present invention, is shown as comprising a pair of tube conveying platforms 12 and 14 which are angularly disposed relative to one another and around which a tube conveying belt, generally designated by the numeral 16, as rotatably mounted. The apparatus 10 is adapted to convey relatively small cross-sectioned elongated workpieces, herein illustrated as thin-walled tubular members generally designated by the numeral 17, between two different work stations or the like, for example, between a tube mill and a tote box, pallet truck, or the like, as will hereinafter be described.

Referring now in detail to the construction of the conveying platform 12, as best seen in FIGURES 1 and 2, the platform 12 comprises a pair of spaced parallel side members 18 and 20 which are preferably constructed of steel I-beam stock and are interconnected by means of a pair of diagonally extending reinforcing members 22 and 24 that are rigidly secured to the opposite ends of the side members 18 and 20 as by welding or the like. Mounted on each end of the side members 18 and 20 is a bearing or journal housing, generally designated by the numeral 26 and one of which is illustrated in FIGURE 1, the housings 26 being adapted to journal support a pair of shafts or axles 28 and 30 which extend between the ends of the side members 18 and 20 for rotatable support of the conveying belt 16, as will be described. The opposite ends of the shafts 28 and 30 extend outwardly from the outboard sides of the side members 18 and 20 and each has a sprocket member 32 rigidly secured thereto by suitable keyway member 33, the sprocket members 32 thereby being adapted to rotate upon rotation of the shafts 28 and 30, as will be described.

Referring now to the construction of the conveying platform 14, as seen in FIGURES 1 and 2, the platform 14 comprises a pair of spaced parallel side members 34 and 36 which are preferably constructed of steel I-beam stock and are pivotably secured at their upper ends to the shaft 30 directly inboard of the side members 18 and 20 of the conveying platform 12. The platform 14 also comprises a pair of horizontally extending reinforcing members 37 which extend between and are rigidly secured as by welding to the adjacent ends of the side members 34 and 36 of the platform 14. Mounted on the lower ends of the side members 34 and 36 are a pair of journal housings, generally designated 38, that are similar in construction to the aforementioned housings 26 and which function to journal support an elongated cylindrical shaft or axle 40 that extends between and is rotatably mounted at the lower ends of the side members 34 and 36. A pair of sprocket members 42 are rigidly secured by keyways 44 to the opposite ends of the shaft 40 which extend outwardly from the outboard sides of the side members 34 and 36, the sprocket members 42 being adapted to cooperate with the aforementioned sprocket members 32 for the rotatable support of the conveying belt 16, as will later be described.

The conveyor platforms 12 and 14 are angularly supported relative to one another by means of a pair of brace members 45 which extend between the upper ends of the side members 18, 20 and medial sections of the side members 34 and 36, the brace members being secured to the side members 18, 20, 34 and 36 by means of suitable screws, bolts or the like 46, as best seen in FIGURE 2. In the event that it is desired to have the conveyor platform 14 adjustably secured relative to the platform 12, it may be possible to substitute hydraulically energized piston and cylinder assemblies for the brace members 45 such that suitable energization and deenergization of the cylinder assemblies will vary the angular relationship between the platforms 12 and 14.

The apparatus 10 is adapted to be supported upon the floor or the like by means of a support structure, generally designated 47, which comprises a pair of spaced parallel base members, one of which is illustrated in FIGURES 1 and 2 and is designated by the numeral 48, which are preferably constructed of steel I-beam stock and are adapted to bear upon the aforesaid floor at positions directly outboard from the outer sides of the side members 18 and 20 of the conveying platform 12. A pair of spaced parallel I-beam reinforcing members 50 and 52 extend transversely between the base members, the reinforcing members 50 and 52 being rigidly secured at their opposite ends to the inboard sides of the base members as by welding or the like. A pair of leg members, one of which is illustrated in FIGURES 1 and 2 and designated by the numeral 54, extend vertically upwardly from the forward ends of the base members 48 and are rigidly secured at the lower ends as by welding to the upper sides thereof. Secured to the upper ends of the leg members 54 is a pair of inwardly projecting pivot pins, representatively illustrated in FIGURES 1 and 2 and designated by the numeral 56. The pivot pins 56 are adapted to be inserted within suitable complementary shaped apertures (not shown) formed in the lower ends of side members 18 and 20 of the conveying platform 12, whereby the platform 12 along with the platform 14 which is supported on the upper end thereof, is pivotable about a horizontal axis defined by the pivot pins 56, as will be described.

Mounted on the rear ends of each of the base members 48 is an upwardly projecting support member 57 upon which the lower ends of a pair of hydraulically energized piston and cylinder assemblies 58 are pivotably mounted. The upper ends of the assemblies 58 are connected to the outboard sides of the side members 18 and 20 intermediate the opposite ends thereof by suitable brackets 59 which are secured to the side members 18 and 20 by suitable bolts, screws or the like 60. Upon energization of the assemblies 58, the conveyor platform 12 is pivoted upwardly about the horizontal axis defined by the aforementioned pivot pins 56. In a similar manner, upon deenergization of the piston and cylinder assemblies 58, the platform 12 is pivoted downwardly about the axis defined by the pins 56. With this construction, the apparatus 10 of the present invention is adapted to facilitate loading the tubular workpieces 17 into a conventional pallet box, tote truck or the like, as will be described.

Referring now in detail to the construction of the tube conveying belt 16, in general, the belt 16 comprises a pair of spaced parallel conveyor chains 61 which are rotatably mounted on the sprocket members 32 and 42 and between which extends a multiplicity of tube supporting rails, generally designated by the numeral 62. As seen in FIGURES 4 and 6, each of the conveyor chains 61 comprises a multiplicity of individual chain links, each of which includes a pair of spaced inner and outer link members 66 and 68, respectively, that are connected at each end to the corresponding link members 66, 68 of the adjacent chain links by transversely extending pins 69. A plurality of roller members 70 are rotatably mounted one on each of the pins 69, as seen in FIGURES 5 and 6, and are adapted to bear upon the upper surfaces of the side members 18, 20 and 34, 36 of the platforms 12 and 14, respectively. The construction of conveyor chains 61 is of a type well known in the art with the exception that the inner link members 66 of each of the chain links is formed with an inwardly projecting rail supporting flange section 71 which is adapted to be secured to one end of one of the rails 62, as will hereinafter be described.

As best seen in FIGURES 4–6, each of the rails 62 is generally Z-shaped in transverse section and comprises a flat enlongated base or securing section 72 and an outwardly projecting medial section 74 which extends perpendicularly away from one edge of the securing section 72 and terminates at its outermost edge in a tube retaining flange section 76 which extends perpendicularly away from the medial section 74 in the opposite direction from the section 72. The rails 62 are preferably constructed of a substantially heavy gauge sheet metal and are secured in a spaced parallel relation to the conveyor chains 61 by having the ends of the securing sections 72 thereof rigidly secured, as by a suitable rivet or the like 78, to the inwardly projecting flange sections 71 of the respective conveyor link members 66 adjacent the ends of the rails 62, as best seen in FIGURE 5.

It will be seen that upon rotation of the shafts 28, 30 and 40, the sprocket members 32 and 42 will rotate, causing the conveyor belt 16 to traverse around the outer peripheries of the conveying platforms 12 and 14 in the direction of the arrows in FIGURE 2. As seen in FIGURES 2 and 3, the conveying platform 12 is angularly supported upon the structure 47 in a manner such that as the tube supporting rails 62 traverse upwardly along the top of the platform 12, the sections 72 and 74 of each of the rails 62 define a generally V-shaped channel, within which the tubular workpieces 17 are adapted to be conveyed, the rail sections 74 being disposed or inclined at a sufficient angle from the horizontal such that the tubes 17 will be positively retained upon the rails 62 as they move towards the uppermost end of the conveying platform 12. In a similar manner, the conveying platform 14 is angularly supported such that as the conveyor belt 16 traverses downwardly along the top or uppermost surface thereof, the medial sections 74 of each of the rails 62 will be angularly offset or inclined from the horizontal such that the tubular workpiece 17 will be biased toward the platform 14 and thus be positively retained upon the conveyor belt 16, the flanges 76 on each of the rails 62 further serving to retain the tubular workpieces 17 upon the conveyor belt 16 until the workpieces 17 are conveyed to a preselected position on the platform 14, as will later be described.

A pair of generally inverted J-shaped conveyor belt guide members 80 are secured to the lower sides of the side members 18 and 20 of the platform 12 by means of a plurality of mounting plates 82 and serve to slidably support the conveying belt 16 at a position adjacent the lower side of the platform 12 as the belt 16 traverses the apparatus 10. The guide members 80 comprise semicircular upper sections 84 and substantially elongated lower sections 86 which extend parallel to the lower sides of the side members 18 and 20 and are supported at a position spaced therefrom by means of the aforesaid mounting plates 82. Suitable brace members 88 may be provided on the guide members 80 to preclude any relative movement between the upper sections 84 and lower sections 86 thereof.

Means for tensioning the conveyor belt 16 upon the apparatus 10 and hence maintaining the conveyor chains 61 in peripheral contact with the sprocket members 32 and 42 is provided by a counterweight assembly 90 which comprises a pair of elongated steel I-beam arms 92 which are pivotably mounted at their lower ends to the lower or undersides of the side members 18 and 20 by suitable pivot pins or the like 94. The outer ends of the arms 92 are provided with journal housings 96 that are rigidly secured to the lower sides of the arms 92 and are adapted to rotatably support a pair of sprocket members 98 which are adapted to engage the conveyor chains 61 in the manner best illustrated in FIGURE 2. The arms 92 are sufficiently heavy such that the conveyor chains 61, and hence a portion of the entire conveyor belt 16, is biased away from the lower side of the lower end of the conveyor platform 12, whereby to maintain the belt 16 in a state of tension around the platforms 12 and 14 such that the chains 61 are continuously peripherally engaged with the sprocket members 32 and 42.

The conveyor belt 16 is rotated around the platforms 12 and 14 by means of a suitable drive motor 100 which is mounted on the outboard side of the side member 18, as illustrated in FIGURES 1 and 2. The motor 100 is connected in a conventional manner to a speed-reducing mechanism, representatively designated by the numeral 102, which is adapted to impart rotary movement to a drive chain 104 which is rotatably mounted on a sprocket member 106 that is rigidly secured to the outer end of the shaft 30. With this construction, energization of the motor 100 causes the drive chain 104 to rotate, resulting in the drive shaft 30 and sprocket members 32 rotating, which in turn causes the entire conveyor belt 16 to traverse around the conveyor platforms 12 and 14.

By way of example, the apparatus 10 of the present invention is shown operatively associated with a loading platform 108 (see FIGURES 1 and 2) of a tube mill or the like along which the tubular workpieces 17 are conveyed subsequent to the final assembly thereof. The apparatus 10 is oriented relative to the platform 108 such that the lower end of the conveyor platform 12 projects slightly beneath the unloading platform 108 and such that the tubular workpieces 17 being transferred along the platform 108 will roll under the influence of gravity onto the tube supporting rails 62 of the conveyor belt 16. Assuming that the drive motor 100 is energized, the conveyor belt 16 will rotate in a clockwise direction in FIGURES 2 and 3, whereby the tubular workpieces 17 which have rolled onto the belt 16 from the platform 108 will be carried upwardly along the upper surface of the platform 12 by means of the belt 16. As hereinbefore described, the sections 72 and 74 of each of the rails 62 define a V-shaped channel within which the tubular workpieces 17 are carried or contained, the rail sections 74 being inclined upwardly sufficiently to positively retain the workpieces 17 on the conveyor platform 12. As each of the workpieces 17 reaches the upper end of the platform 12, it rolls forward and is retained upon the platform 14 by the section 74 and retaining flange 76 of the rail 62 directly ahead or preceding the rail 62 which carried it to the top of the platform 12. As best seen in FIGURE 3, as the conveyor belt 16 traverses the platform 14, the medial sections 74 of each of the rails 62 is inclined at an angle sufficient to retain the workpieces 17 upon the conveyor belt 16, the flange sections 76 serving to retain the tubular workpieces 17 on the belt 16 until the rails 62 supporting them traverse about the lowermost portion of the periphery of the sprocket members 42, at which time the workpieces 17 will drop downwardly from the lower end of the platform 14.

In FIGURE 2 of the drawings, the tubular workpieces 17 are shown as dropping off from the lower end of the paltform 14 into a tote truck 110 which comprises a pair of spaced parallel sides 112 and 114 that extend upwardly from the opposite sides of a bottom portion 116, suitable wheels 118 being secured to the lower side of the bottom portion 116 to facilitate movement of the truck 110. It will be apparent, of course, that the apparatus 10 may be used to convey the tubular workpieces 17 into various other types of receptacles such as pallet boxes and the like.

In accordance with the principles of the present invention, means are provided for automatically energizing the piston and cylinder assemblies 58 in response to the quantity of tubular workpieces 17 which are deposited into the truck 110, whereby the conveyor platforms 12 and 14 may be initially oriented such that the lower end of the platform 14 is directly adjacent the bottom portion 116 of the truck 110. At such time as a predetermined quantity of workpieces 17 has been deposited into the truck 110 by the apparatus 10, the platforms 12 and 14 may be automatically pivoted in a counterclockwise direction in FIGURE 2 by the assemblies 58, whereby elevating the lower end of the platform 14 with respect to the truck's lower section 116 so that there is no interference between the rotating belt 16 and the workpieces 17 previously deposited into the truck 110. With this construction, the distance from the lower end of the platform 14 to the position where the workpieces 17 are deposited into the truck 110 is always minimized, thus minimizing the possibility of the workpieces 17 becoming dented or similarly damaged as they drop into the truck 110. The aforesaid means for automatically moving conveyor platforms 12 and 14 in response to the quantity of workpieces 17 in the truck 110 comprises a plurality of photoelectric cells, generally designated 120, which are supported upon a suitable vertically extending member 122 adjacent the side 112 of the truck 110. The cells 120 are adapted to cooperate with a plurality of light sources 124 which are mounted on a vertically extending member 126 adjacent the side 114 of the truck 110. The photoelectric cells 120 are connected in a conventional manner to a suitable relay means (not shown) which is adapted to selectively effect energization and deenergization of the piston and cylinder assemblies 58. As the transmission of light between the lowermost light source 124 and cell 120 is interrupted by a predetermined quantity of tubular workpieces 17 being deposited within the truck 110, the assemblies 58 will be energized for a predetermined amount of time, thereby pivoting the conveyor platforms 12 and 14 in a counterclockwise direction (see FIGURE 2), resulting in the lower end of the platform 14 being elevated a predetermined amount within the truck 110, as above described. The rest of the photoelectric cells 120 and light sources 124 are adapted to function in a similar manner to selectively energize the piston and cylinder assemblies 58 to cause the platforms 12 and 14 to be pivoted such that the workpieces 17 may drop freely off the lower end of the platform 14 into the truck 110. It may be noted that the uppermost photoelectric cell 120 may be connected through conventional electric circuitry to the means for controlling energization of the drive motor 100, i.e., on-off switch or the like, whereby the apparatus 10 will become inoperative at such time as a predetermined number of tubular workpieces 17 have been deposited within the truck 110.

While it will be apparent that the exemplary embodiment herein illustrated is well calculated to fulfill the objects above stated, it will be appreciated that the tubular workpiece conveying apparatus 10 of the present invention is susceptible to modification, variation and change without departing from the proper scope or fair meaning of the subjoined claim.

What is claimed is:

A machine for transferring tubes or the like one at a time from a first location to a second location and depositing them in a pile on a horizontal support at said second location comprising a first rectangular frame and a second rectangular frame, each of said frames extending vertically at a non-perpendicular angle to the horizontal and each having a lower end and an upper end, the top side of the lower end of the first frame being positioned to receive tubes to be transferred, the lower end of the second frame being free and positioned above said horizontal support to deposit tubes thereon, a horizontal axle rotatably supported in the upper ends of the first and second frames and pivotally interconnecting them, adjustable horizontally extending brace means connected at opposite ends respectively to the first and second frames to secure them against pivoting about said axle and to fix the included angle between the first and second frames, first means supporting the lower end of the first frame for pivotal movement in a vertical plane, second means for angularly moving said first frame and said second frame about said first means and for holding and supporting said frames in a position so that the lower end of the second frame has a desired position with respect to said horizontal support, said second means being connected to said first frame at a point intermediate the lower and upper ends thereof, link chain sprockets rotatably supported on opposite sides of the lower end of both the first and second frame, link chain drive sprockets secured to opposite ends of said axle for rotation with it, a drive motor supported on said first platform between its lower end and said intermediate point thereon connected to said second means, chain drive means connecting said drive motor to said axle to rotate the axle and therefore said link chain drive sprockets in one direction toward the lower end of the second frame, an endless link chain on each side of said first and second frames extending around said sprockets and driven by said drive sprockets in said one direction, each link of said chain comprising a pair of parallel transversely spaced link members, transverse link pivot pins at each end of the link members connecting said members together and pivotally interconnecting adjacent ends of adjacent links, rollers disposed between said link members on said link pivot pins and riding on said first and second frames to transfer load on the links into the frames, the inside link member of each link having a transverse flange extending inwardly toward the center line of the frames, a plurality of Z-shaped tube support rails each having a central web and top and bottom flanges respectively extending in opposite directions from said web, the bottom flange of one of said rails being secured at opposite ends to the transverse flanges of each pair of transversely aligned inside link members on opposite sides of said frames, so that each link carries one end of a rail, the rails being disposed on the links so that the rail webs are substantially aligned with the trailing link pivot pins and the top flanges extend in a direction opposite to said direction of movement of the link chain.

References Cited
UNITED STATES PATENTS

| | | | |
|---|---|---|---|
| 2,272,750 | 2/1942 | Miller | 221—77 |
| 3,029,927 | 5/1962 | Farwell | 198—134 |
| 3,147,846 | 9/1964 | Huntoon | 198—122 |
| 3,254,755 | 6/1966 | O'Brien | 214—17.62 |

EVON C. BLUNK, *Primary Examiner.*

RICHARD E. AEGERTER, *Examiner.*